United States Patent
Awano et al.

[11] Patent Number: 5,363,304
[45] Date of Patent: Nov. 8, 1994

[54] METHOD FOR CONTROLLING A HYDRAULIC EXCAVATOR

[75] Inventors: Katsusuke Awano, Akashi; Shiro Honmura, Kakogawa; Akio Tanaka, Takasago, all of Japan

[73] Assignee: Shin Caterpillar Mitsubishi, Ltd., Tokyo, Japan

[21] Appl. No.: 196,824

[22] Filed: Feb. 15, 1994

Related U.S. Application Data

[63] Continuation of Ser. No. 819,064, Jan. 10, 1992, abandoned.

[30] Foreign Application Priority Data

Jan. 23, 1991 [JP] Japan .................. 3-102129

[51] Int. Cl.$^5$ ............................... E02F 3/32
[52] U.S. Cl. .................. 364/424.07; 364/167.01; 172/4.5
[58] Field of Search ............... 364/167.01, 424.07; 37/DIG. 1, DIG. 20; 172/2, 4, 4.5

[56] References Cited

U.S. PATENT DOCUMENTS

| | | | |
|---|---|---|---|
| 3,636,325 | 1/1972 | Chytil | 364/424.07 |
| 4,129,224 | 12/1978 | Teach | 37/DIG. 1 |
| 4,791,549 | 12/1988 | Heiser et al. | 364/167.01 |
| 4,829,418 | 5/1989 | Nielsen et al. | 172/4.5 |
| 4,888,890 | 12/1989 | Studebaker et al. | 37/DIG. 1 |
| 4,889,466 | 12/1989 | Jindai et al. | 172/4.5 |
| 4,910,673 | 3/1990 | Narisawa et al. | 37/DIG. 1 |
| 5,160,239 | 11/1992 | Allen et al. | 172/4.5 |

Primary Examiner—Gary Chin
Attorney, Agent, or Firm—Keck, Mahin & Cate

[57] ABSTRACT

In controlling a hydraulic excavator equipped with a front mechanism having multiple foldable and rotatable joints, the controlling method described enables complex joint actions to be controlled readily by manipulating electrical joy sticks. Translational and rotational control commands are input to a certain point on the longitudinal axis of a rear arm through the joy sticks and cooperative actions of multiple joints are achieved simultaneously.

1 Claim, 4 Drawing Sheets

2a

2b

2c

2d

MONO-AXIS MODE     MULTIPLE-AXES MODE

METHOD FOR CONTROLLING A HYDRAULIC EXCAVATOR

This is a continuation of patent application Ser. No. 07/819,064, filed Jan. 10, 1992 abandoned.

FIELD OF THE INVENTION

This invention relates to a method of controlling a hydraulic excavator and the like for construction work such as digging and other earth moving work.

BACKGROUND OF THE INVENTION

A front mechanism having eight degrees of freedom has previously been disclosed. As shown in FIG. 4, in such a front mechanism, an upper rotating frame 102 is pivotally mounted on a lower traveling body 101 of a hydraulic excavator, and each member of this front mechanism, namely, a rear boom 103 extruded from the upper rotating frame 102, a front boom 104, a rear arm 105, a front arm 106 and a bucket 107 is connected to each other in this order with each foldable joint able to be folded freely up and down in each vertical swing, and furthermore the front boom 104 and rear arm 105 respectively have each joint rotatable around a front boom rotating axis 108 and a rear arm rotating axis 109 each supported longitudinally on the front boom 104 and front arm 106.

With such a front mechanism, work such as open channel side ditching, bank cutting, land cleaning and cutting in any arbitrary direction, and digging around a pole become possible.

Hitherto in controlling a front mechanism, multiple levers and pedals were installed in the cabin of the hydraulic excavator as manipulators corresponding one by one with each joint action. The manipulators were controlled in combination so as to generate the required working conditions.

However, in excavating works such as bank cutting, land clearing, side cutting and open channel side ditching, this traditional controlling method applying these multiple manipulators corresponding one by one with each joint action, has the following difficult problems. For example, in determining the position of the bucket for working, it is necessary for the axial direction of the rear arm to face vertically against the working surface without changing the position of the tip of the rear arm, and to direct the bucket to face toward the excavating direction. Usually these controls are very complex and it is inefficient to work in this way. Furthermore, in order to operate the bucket along the working side or toward a specified working direction, the operator must shift at least five manipulators in harmony, at one time, and this requires skill and experience and, even so, it is inefficient to do so.

Until now, owing to above mentioned cumbersome problems, it was difficult to put a power excavator having arms with multiple directions of freedom of movement, in practical use.

SUMMARY OF THE INVENTION

For solving these troublesome problems encountered in the operation of a power excavator equipped with manipulators corresponding respectively with respective joint action, a new controlling method having the following elements has been invented:

(1) Position sensors which detect respective rotational angle of the upper rotating frame, rear boom, front boom, front boom rotating axis, rear arm and rear arm rotating axis, so that the respective joint locations can be fed back to a control system.

(2) A wrist coordinate system OE-XE YE ZE (rectangular coordinate system) fixed on the tip of the rear arm, to specify the required translational speed commands (each command is directed to the XE, YE and ZE directions) and rotational speed commands (each command allows rotation around the XE, YE and ZE axes) described in the wrist coordinate system.

(3) Specified translational and rotational speed commands, which are input into the origin of the wrist coordinate system through the electrical joy sticks installed in the cabin, compute the angular speeds of each respective joint by combining respective joint angle feed back from each of the joint position sensors.

(4) Computed joint angular speeds are input into a hydraulic control system for driving each hydraulic actuator so as to generate the required excavating work.

A joint position feed back loop may be included in this controlling system for sequentially executing the above steps.

In consequence, as this controlling method uses a method for supplying translational and rotational commands described in the local wrist coordinate system, as aforementioned, to determine the bucket position, by inputting translational commands through the joy sticks, it becomes simple to determine the position for the working surface and working direction without changing the position of the top of the rear arm. Furthermore, in the case of translational work towards a working place or excavating work along a working surface, it is also simple to execute the work by inputting the translational commands through joy sticks. Complicated harmonized joint motions are realized in a simple manner.

DETAILED DESCRIPTION OF THE PREFERRED EMBODIMENTS

A preferred embodiment according to this invention will be described with reference to the attached drawings.

Figure 2:
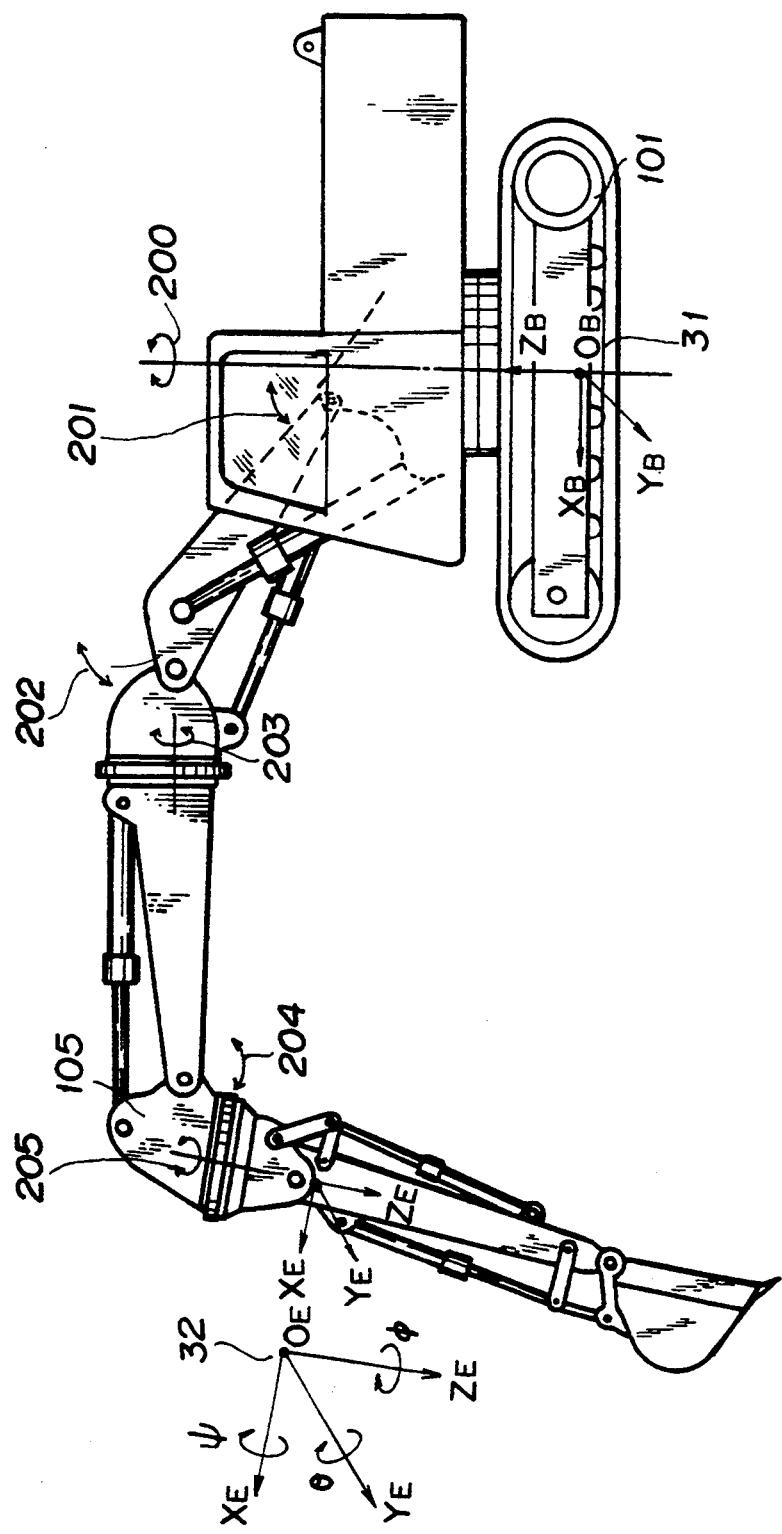
FIG. 2 shows established coordinate systems enabling a controlling method according to this invention.

In FIG. 2, established coordinate systems for this invention are shown. Two coordinate systems are established. The first OB-XB YB ZB coordinate system is the basic absolute coordinate system fixed to the lower traveling body 101, and the second OE-XE YE ZE coordinate system is the local wrist coordinate system fixed to the tip of rear arm 105.

The freedoms of motion of point OE are composed with six freedoms, namely three translational freedoms in each XE, YE and ZE direction, and three relational freedoms in each $\phi$, $\Theta$ and $\phi$ rotation.

The motion of point OE having the above mentioned six freedoms is generated by combining the respective rotations as shown below.

rotation 200 (rotation of upper rotating frame 102)
rotation 201 (folding of rear boom 103)

rotation 202 (folding of front boom 104)
rotation 203 (rotation of front boom 104)
rotation 204 (folding of rear arm 105)
rotation 205 (rotation of rear arm 105)

Figure 3:
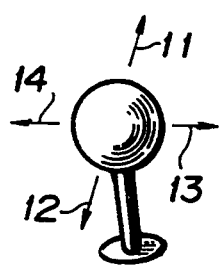
FIG. 3 shows a preferred embodiment of the manipulators.
Figure 3:
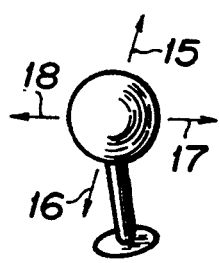
Figure 3:
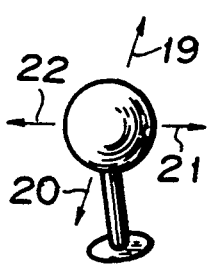
Figure 3:
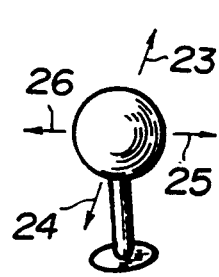
Figure 3:
Figure 4:
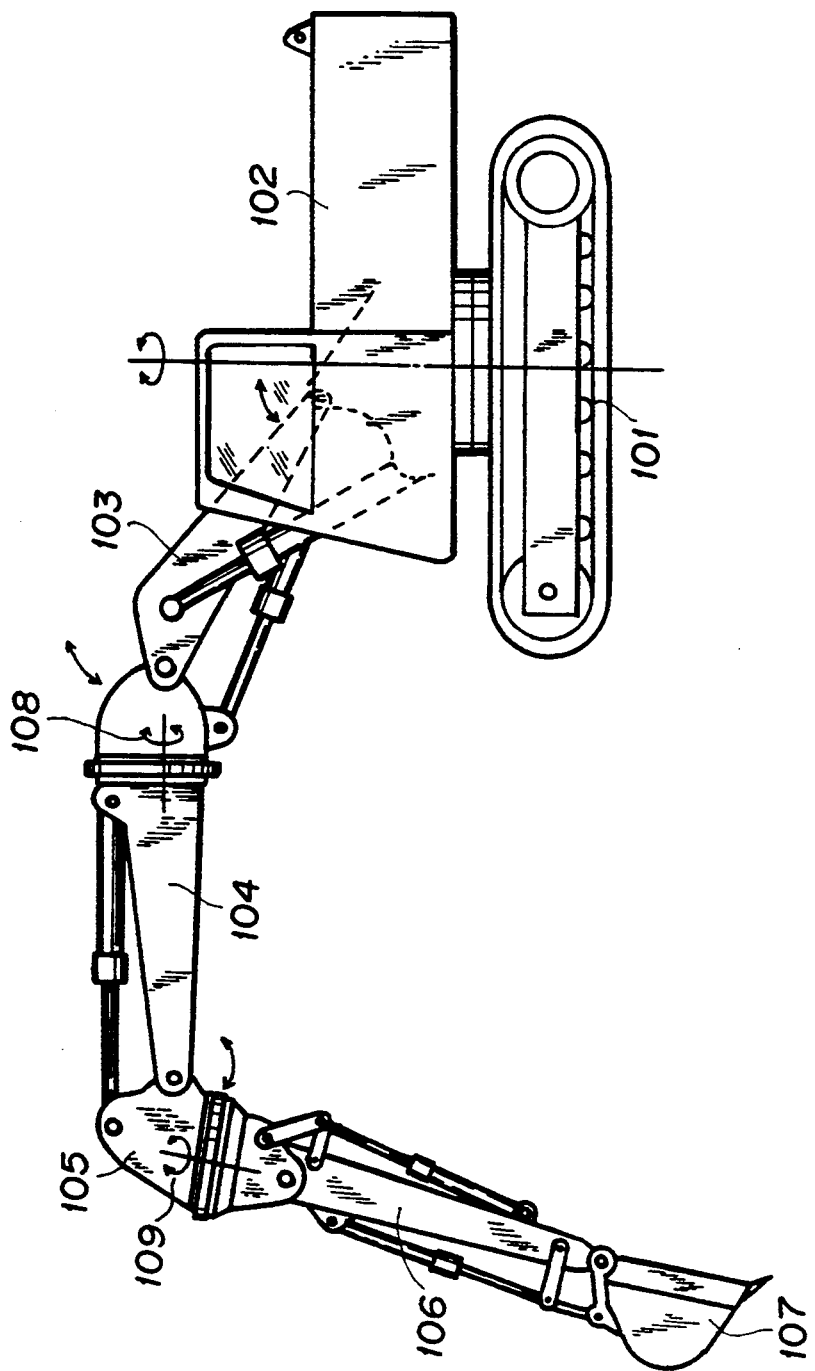
FIG. 4 shows a prior art hydraulic excavator having eight degrees of freedom.

FIG. 3 shows a preferred embodiment of the manipulators installed in the cabin. By selecting a mode selection switch 1, multi-axes mode performing translational and rotational operation in the wrist coordinate system and mono-axis mode commanding operation corresponding respectively to each joint axis are selectable.

Four sets of electrical joy sticks, 2a, 2b, 2c and 2d are installed in the cabin, and each joy stick provides two kinds of controlling commands by shifting each control lever backward and forward or right and left.

In the multi-axes mode, each speed command shown in Table 1 can be input by shifting a control lever.

In general, as moving works towards the working position and digging works are operated continuously, the commands for the front arm and bucket performing digging works can be input in the multi-axes mode in the same way as in the mono-axis mode.

TABLE 1

| multi-axes mode | |
|---|---|
| command | lever position |
| positive $X_E$ direction | position 11 |
| negative $X_E$ direction | position 12 |
| positive $Y_E$ direction | position 13 |
| negative $Y_E$ direction | position 14 |
| positive $Z_E$ direction | position 15 |
| negative $Z_E$ direction | position 16 |
| positive $\psi$ around | position 17 |
| negative $\psi$ around | position 18 |
| positive $\theta$ around | position 19 |
| negative $\theta$ around | position 20 |
| positive $\phi$ around | position 21 |
| negative $\phi$ around | position 22 |
| front arm upward motion | position 23 |
| front arm downward motion | position 24 |
| bucket upward motion | position 25 |
| bucket downward motion | position 26 |

TABLE 2

| mono-axis mode | | |
|---|---|---|
| command | | lever position |
| rear boom | upward motion | position 11 |
| rear boom | downward motion | position 12 |
| upper rotating frame | rightward motion | position 13 |
| upper rotating frame | leftward motion | position 14 |
| front boom | upward motion | position 15 |
| front boom | downward motion | position 16 |
| front boom | rightward motion | position 17 |
| front boom | leftward motion | position 18 |
| rear arm | upward motion | position 19 |
| rear arm | downward motion | position 20 |
| rear arm | rightward motion | position 21 |
| rear arm | leftward motion | position 22 |
| front arm | upward motion | position 23 |
| front arm | downward motion | position 24 |
| bucket | upward motion | position 25 |
| bucket | downward motion | position 26 |

In the mono-axis mode, each command can be input as shown in Table 2.

Figure 1:
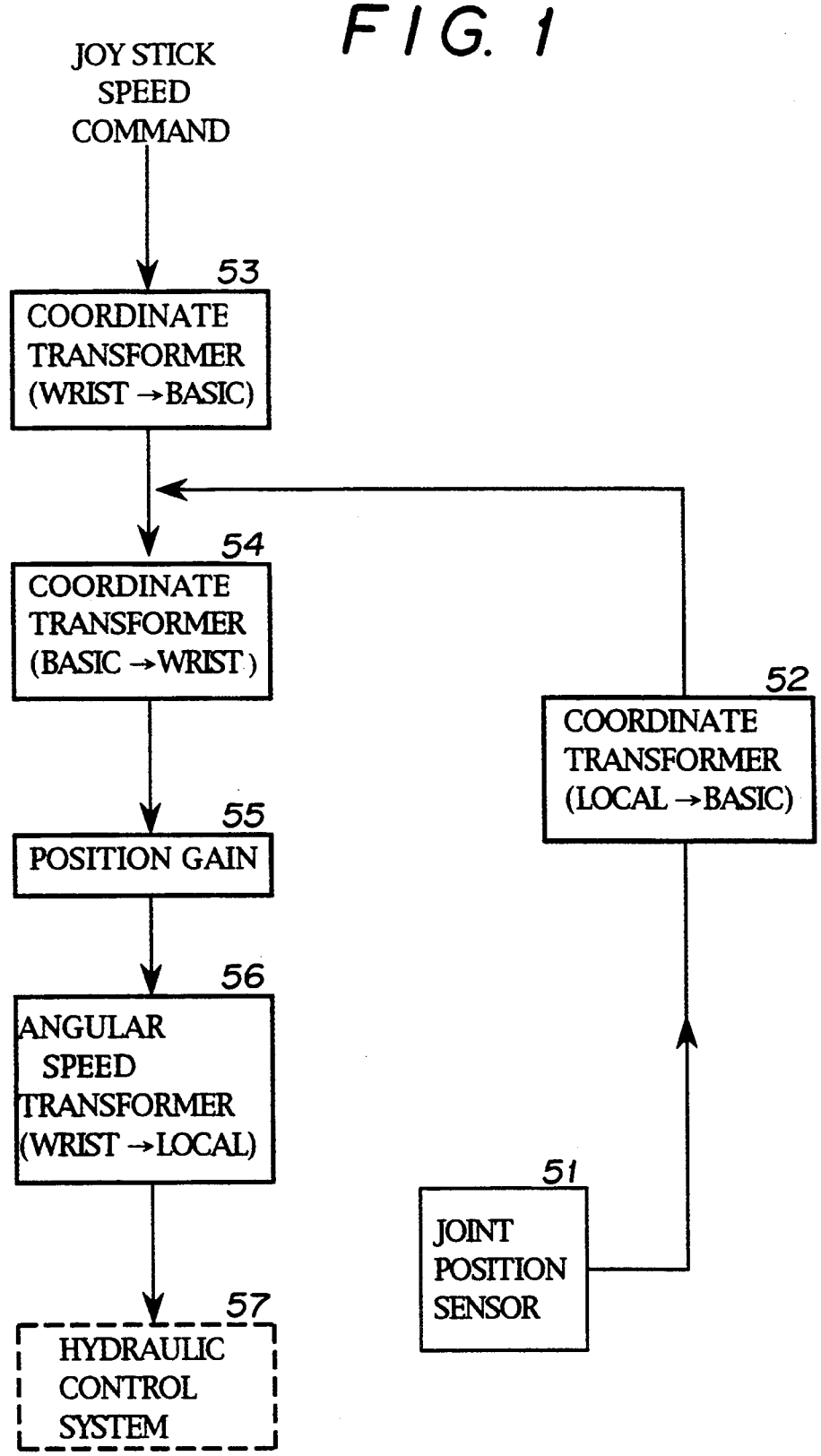
FIG. 1 shows a block diagram of a controlling method according to this invention.

Each sequential step of this method of controlling a hydraulic excavator is described in detail as follows, referring to FIG. 1.

(1) Respective joint angles obtained from each joint position sensor 51 are collected and transformed to the position coordinates of the point OE described in the basic coordinate system through a coordinate transformer 52.

(2) The translational and speed commands inputted from each joy stick are assumed to dictate the position coordinates of the point OE after elapsed unit time, and are transformed to the position coordinates described in the basic coordinate system through a coordinate transformer 53.

(3) Finite differences between coordinates of the point OE at a first time and at an elapsed unit time are transformed to the values described in the wrist coordinate system through a coordinate transformer 54.

(4) The finite differences of position are multiplied by position gains derived from a position gain calculator 55 and are converted to respective joint angle speeds through an angular speed transformer 56.

(5) The respective joint angle speed is sent to a hydraulic control system 57.

(6) The above mentioned transforming and calculating processes are computed through a computer mounted in the cabin of the hydraulic excavator.

By applying this controlling method to control the hydraulic excavator, the following benefits are obtainable:

(1) By inputting only the required rotating commands through the joy sticks, it is possible to determine the required position without changing the position, and difficult operations of independent joint action become unnecessary.

(2) By inputting only the required translational commands through the joy sticks, it is possible to execute the required working movements along a working surface or working direction. It is then unnecessary to combine independent operations related to difficult joint actions.

Accordingly, working efficiency and working accuracy are improved.

What is claimed is:

1. A method for controlling a hydraulic excavator, equipped with a front excavating mechanism comprising freely rotating arms connected by pivotal joints, comprising the steps of:

collecting joint angle data from joint angle detecting sensors mounted on said pivotal joints;

transforming said joint angle data into initial position coordinates of a tip of a rear arm of said front excavating mechanism in a basic coordinate system defined on a lower traveling frame of said hydraulic excavator;

predetermining translational and rotational speeds of said tip enabling execution of a schedule of excavating work;

inputting said translational and rotational speeds through electrical joy sticks installed in a cabin of the excavator for determining position coordinates of said tip at certain elapsed times;

transforming said position coordinates of said tip in a working coordinate system to position coordinates in said basic coordinate system;

obtaining differences between said position coordinates of said tip at present and elapsed unit times;

transforming said differences to values defined in a wrist coordinate system;

multiplying said values defined in the wrist coordinate system by position control gains to obtain multiplied values;

converting said multiplied values to joint angle speeds defined in said wrist coordinate system;

inputting said joint angle speeds, for respective joints, into a hydraulic control system; and operating the arms of the front excavating mechanism of the hydraulic excavator by using a computer located in a cabin of the hydraulic excavator to perform each of said collecting and transforming steps.

* * * * *